United States Patent [19]
Amsden et al.

[11] 4,025,378
[45] May 24, 1977

[54] APPARATUS AND METHOD FOR WELDING A POLYETHYLENE SLEEVE LABEL TO A POLYETHYLENE BOTTLE, THE LABEL HAVING HEAT-ABSORBING AREAS

[75] Inventors: Donald L. Amsden, Toledo; Casimir W. Nowicki, Sylvania, both of Ohio

[73] Assignee: Owens-Illinois, Inc., Toledo, Ohio

[22] Filed: Feb. 10, 1975

[21] Appl. No.: 548,517

[52] U.S. Cl. .................. 156/272; 156/86; 156/306
[51] Int. Cl.² .................. B29E 19/02; C09J 5/00
[58] Field of Search .......... 156/272, 380, 293, 294, 156/86, 306

[56] References Cited
UNITED STATES PATENTS

| | | | |
|---|---|---|---|
| 2,402,631 | 6/1946 | Hull | 156/380 |
| 3,347,729 | 10/1967 | Seefluth | 156/380 |
| 3,523,052 | 8/1970 | Bolen | 156/499 |
| 3,549,451 | 12/1970 | Kugler | 156/272 |
| 3,723,212 | 3/1973 | Casper | 156/272 |
| 3,804,691 | 4/1974 | Trivedi | 156/272 |

*Primary Examiner*—Douglas J. Drummond
*Attorney, Agent, or Firm*—Robert F. Rywalski; Edward J. Holler; R. D. Heberling

[57] ABSTRACT

There is disclosed a method for attaching a polyethylene sleeve label to a polyethylene bottle, the label having on the outer surface thereof means for absorbing heat in local, discrete areas of the label at a rate greater than that of other areas of the label; and means for welding the label to the body at the junction of the outer surface of the body and the inner surface of the label, adjacent the local heat-absorbing areas.

6 Claims, 2 Drawing Figures

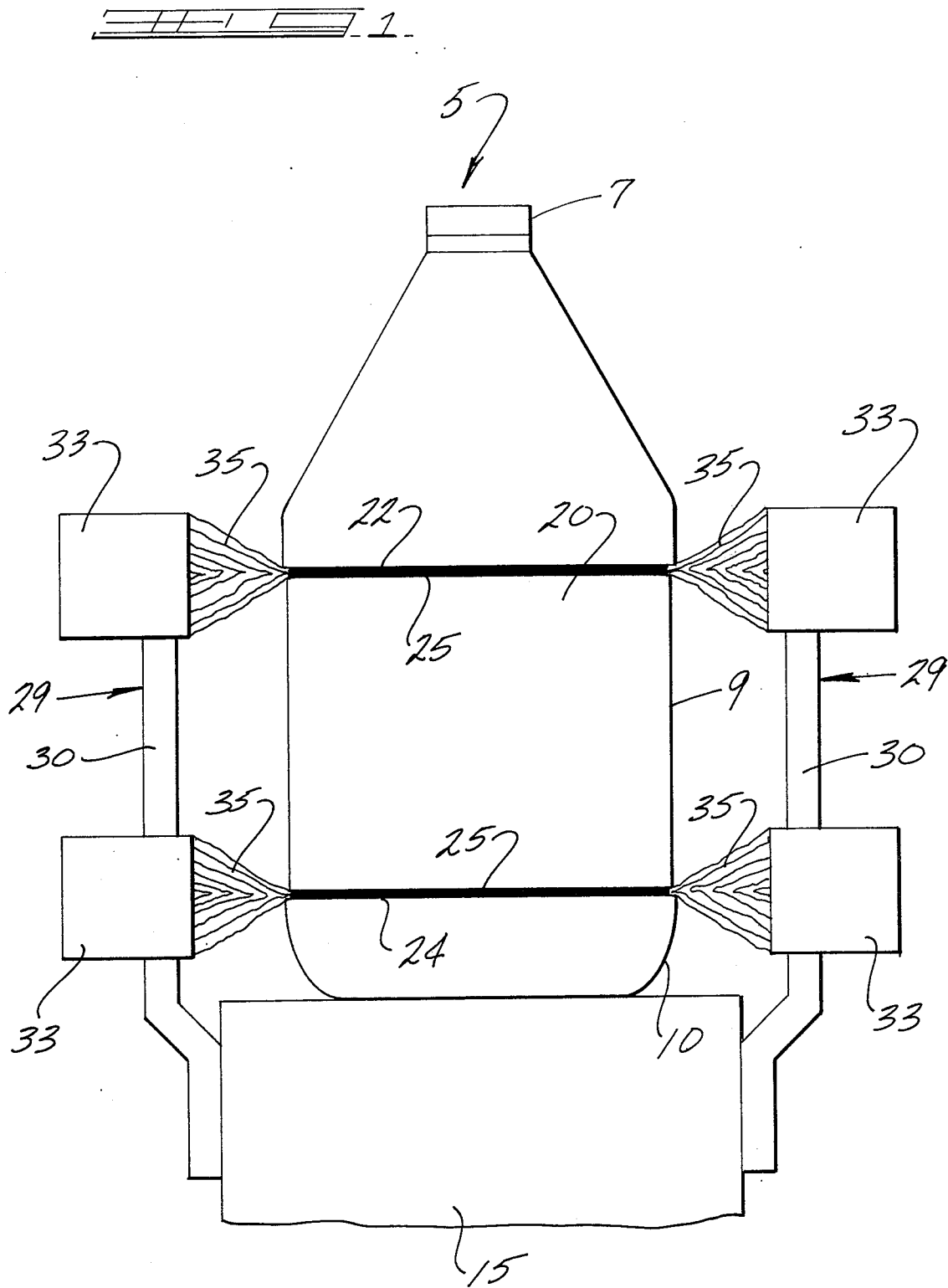

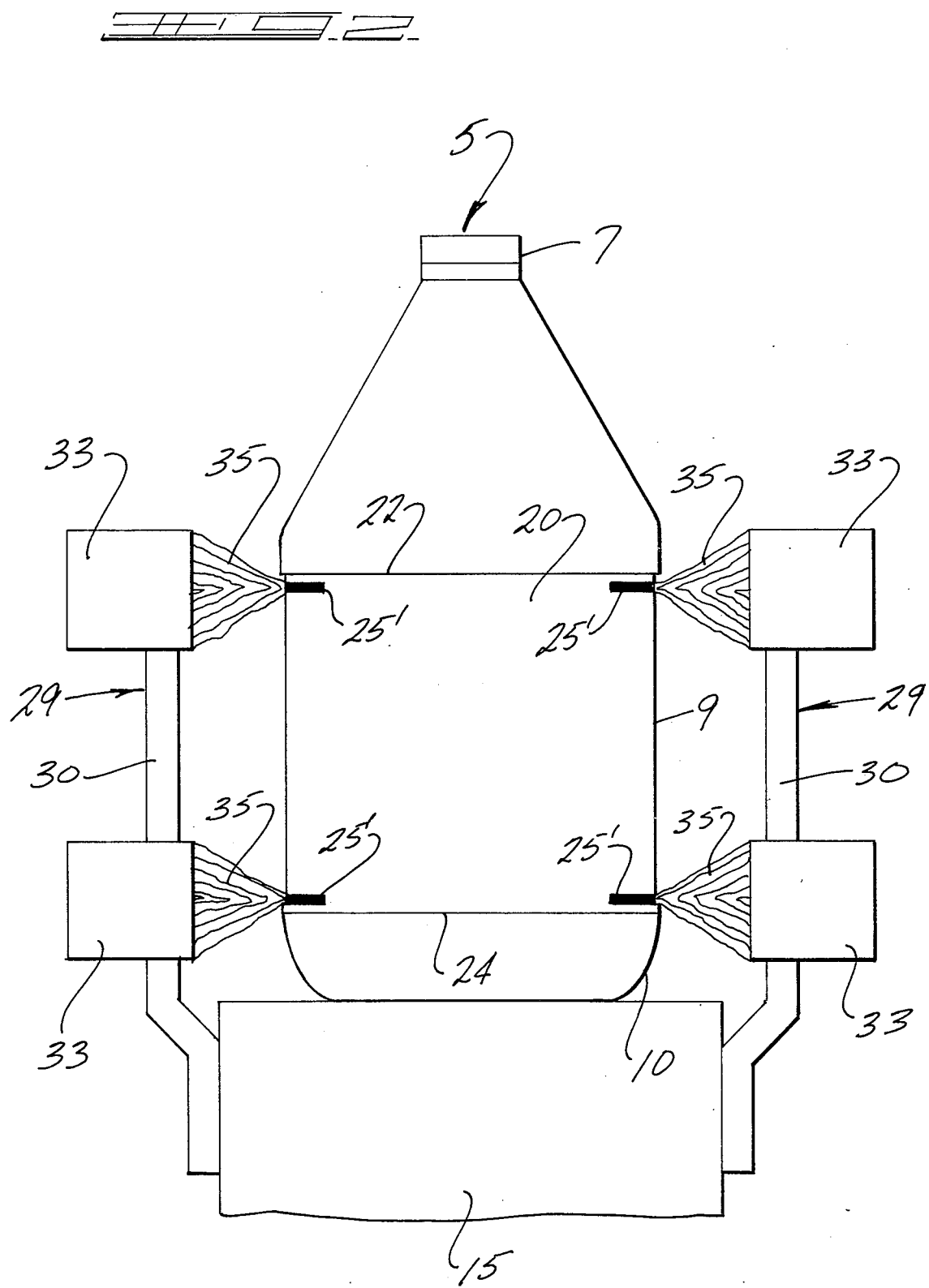

APPARATUS AND METHOD FOR WELDING A POLYETHYLENE SLEEVE LABEL TO A POLYETHYLENE BOTTLE, THE LABEL HAVING HEAT-ABSORBING AREAS

THE INVENTION

The present invention is directed to apparatus and method for welding polyethylene sleeve labels to polyethylene bottles, the label having local, discrete heat-absorbing areas. The label is welded to the bottle at such heat-absorbing areas of the label, so as to prevent loss of the label from the bottle.

It is desirable to weld and secure polyethylene sleeve labels to polyethylene bottles so such lable will not be lost from the bottle. Particularly in the case of poisons, the label must remain affixed to the bottle so as to warn users of the toxic contents or previous toxic contents of the bottle.

It is an object of the present invention to provide an apparatus for attaching a polyethylene sleeve label to a polylethylene bottle, the label having means for absorbing heat in local, discrete areas thereof, the apparatus including means for welding the label to the body at such local, heat-absorbing areas.

It is an object of the present invention to provide a method for attaching a polyethylene sleeve label to a polyethylene bottle so as to prevent loss of the label, the method comprising the steps of:
 a. supporting the bottle;
 b. providing means in the lable for absorbing heat in local, discrete areas at a rate greater than other areas of the label; and
 c. welding the label to the bottle at the heat-absorbing areas of the label so as to prevent loss of the label without distorting printed portions of the label.

It is an object of the present invention to provide a polyethylene bottle having secured to the body on the outer surface thereof a polyethylene sleeve label, the welded label being secured to the body at local, heat-absorbing areas on the label. These and other objects will be apparent in the specification that follows, in the appended claims, and the drawings, in which:

FIG. 1 shows a schematic, elevational view of a polyethylene bottle with a polyethylene label, the bottle being supported by a conveyor and moved between welding means, including quartz heaters having focused heat output, the label having heat-absorbing areas to absorb heat from the focused heat rays; and FIG. 2 is a schematic, elevational view of apparatus for welding a polyethylene sleeve label to a polyethylene bottle, the apparatus and bottle being similar to that of FIG. 1, except that the top and bottom marginal edge portions of the label have relatively short rectangular heat absorbing areas. The present invention provides a method for attaching a polyethylene sleeve label to a polyethylene bottle so as to prevent loss of the label, the method comprising the steps of:
 a. supporting the bottle with a label in a position so that the label can be secured to the bottle; and
 b. welding the label to the bottle by heating the label at heat-absorbing areas of the label.

As shown in FIG. 1, apparatus for attaching a polyethylene sleeve label to a polyethylene bottle 5 is shown, the bottle having a neck 7, a body 9 and a bottom 10. As shown in the FIGURE, the bottle 5 is supported on conveyor 15, suitable for moving a plurality of bottles on a high-speed production line.

A polyethylene sleeve label 20 is provided, the label having a top edge portion 22 and a bottom edge portion 24 and heat-absorbing areas of a local discrete nature 25 on the outer surface of the label. In the particular embodiment shown, the heat-absorbing areas are black annular bands located at the top and bottom marginal edge portions of the label.

As shown in FIG. 1, there is provided welding means 29, including brackets 30, heaters 33, which focus heat rays 35 on the local, discrete, heat-absorbing areas 25. The areas 25 are preferably made by black ink, although other dark marking material, such as blue, green and purple inks, can be used.

As shown in FIG. 2, in which the apparatus and bottle are similar to that of FIG. 1, the label has local heat-absorbing areas 25' that are generally short, relatively thin rectangular areas preferably located near the top edge 22 and bottom edge 24 of the label. The areas 25' are preferably located on opposite sides of the label and aligned with the focused heat rays 35 of the welding means 30.

It can be seen that the novel methods for attaching the polyethylene sleeve labels to the polyethylene bottles include supporting the bottles, providing means on the label for absorbing heat in local, discrete areas, and welding the labels to the bottles, preferably by focusing heat rays on the heat-absorbing areas of the label.

The resultant bottles has a polyethylene label welded securely to the bottle. An attempt to remove the label will tear the label before breaking the weld.

The welding can be accomplished very quickly, generally in less than about 3 or 4 seconds and usually in about 2 seconds. The invention described herein is an improvement on the invention described in our United States patent application entitled "Apparatus and Method for Welding a Polyethylene Sleeve Label to a Polyethylene Bottle," Ser. No. 548,541, filed Feb. 10, 1975. In the latter application, the welding generally is done in about 20 to 22 seconds in contrast to about 2 seconds for the welding step of the present invention.

What is claimed is:

1. A method for attaching a polyethylene sleeve label to a polyethylene bottle, the bottle having a neck, a body and a bottom; the method comprising the steps of:
 a. supporting said bottle with the label located around the body of the bottle, said label including means on the label for absorbing heat in local discrete areas at a rate greater than other areas of the label; and
 b. welding the label to the bottle, with radiant heat without an adhesive, adjacent the heat-absorbing areas of the label at the junction of the outer surface of the body of said bottle and inner surface of said label to thereby prevent loss of the label.

2. A method as defined in claim 1 in which the welding step includes concentrating heat on said heat-absorbing areas of the label with heating means disposed on opposite sides of said bottle and label so as to provide non-continuous welded areas which are disposed on opposite sides of the bottle.

3. The method of claim 1 wherein said means on said label are at least disposed on opposite sides thereof and the label is welded to the bottle substantially solely on opposite sides of the bottle.

4. A method for securely attaching a polyethylene sleeve label to a polyethylene bottle comprising, providing a polyethylene bottle carrying said label, said label having an area capable of absorbing heat at a rate greater than another area of said label, and welding, with radiant heat without an adhesive, said label to said bottle by heating said greater heat absorbing area so as to prevent loss of said label from said bottle.

5. The method of claim 4 wherein said step of welding is effected while said bottle carrying said label is moved by a conveyor in an upright position.

6. The method of claim 5 wherein said welding is effected to produce opposite, separate welded areas.

* * * * *